Dec. 4, 1934. L. S. MAEDE Re. 19,390

METHOD AND APPARATUS FOR ROASTING COFFEE

Original Filed Sept. 24, 1923 3 Sheets-Sheet 1

Inventor

Leland S. Maede

By Lyon & Lyon

Attorneys

Dec. 4, 1934. L. S. MAEDE Re. 19,390

METHOD AND APPARATUS FOR ROASTING COFFEE

Original Filed Sept. 24, 1923 3 Sheets-Sheet 2

Inventor

Leland S. Maede

By Lyon & Lyon

Attorneys

Dec. 4, 1934. L. S. MAEDE Re. 19,390

METHOD AND APPARATUS FOR ROASTING COFFEE

Original Filed Sept. 24, 1923 3 Sheets-Sheet 3

Inventor
Leland S. Maede

By Lyon & Lyon
Attorneys

Reissued Dec. 4, 1934

Re. 19,390

UNITED STATES PATENT OFFICE 19,390

METHOD AND APPARATUS FOR ROASTING COFFEE

Leland S. Maede, Brooklyn, N. Y.

Original No. 1,915,372, dated June 27, 1933, Serial No. 307,867, September 24, 1928. Application for reissue September 17, 1934, Serial No. 744,451

10 Claims. (Cl. 34—5)

This invention relates to a method and apparatus for roasting coffee.

In the operation of modern coffee roasters, it is common to heat the coffee to be roasted by means of gas burners, and to permit the hot gases or products of combustion to pass through the roasting cylinders in direct contact with the coffee. This is, of course, desirable from a point of heat economy, but I have discovered that as the coffee bean approaches the point of highest temperature and final roasting, a certain amount of the products of combustion are absorbed and the taste of the coffee is deleteriously affected.

According to my invention I provide a coffee roaster in which the preliminary heating and roasting of the coffee bean is accomplished by gas heat, and with products of combustion, as absorption does not take place during these periods. I then discontinue the application of the gas heat, and subject the coffee to a higher temperature and final roasting operation by subjecting it to the direct action of radiant heat energy, after which I rapidly cool the coffee. I find that coffee roasted in this manner has a decidedly improved taste and aroma, and that objectionable gas taste and smell are entirely obviated.

A roasting apparatus of my invention and for practicing my method is shown by way of illustration in the accompanying drawings, in which.

Figure 1:
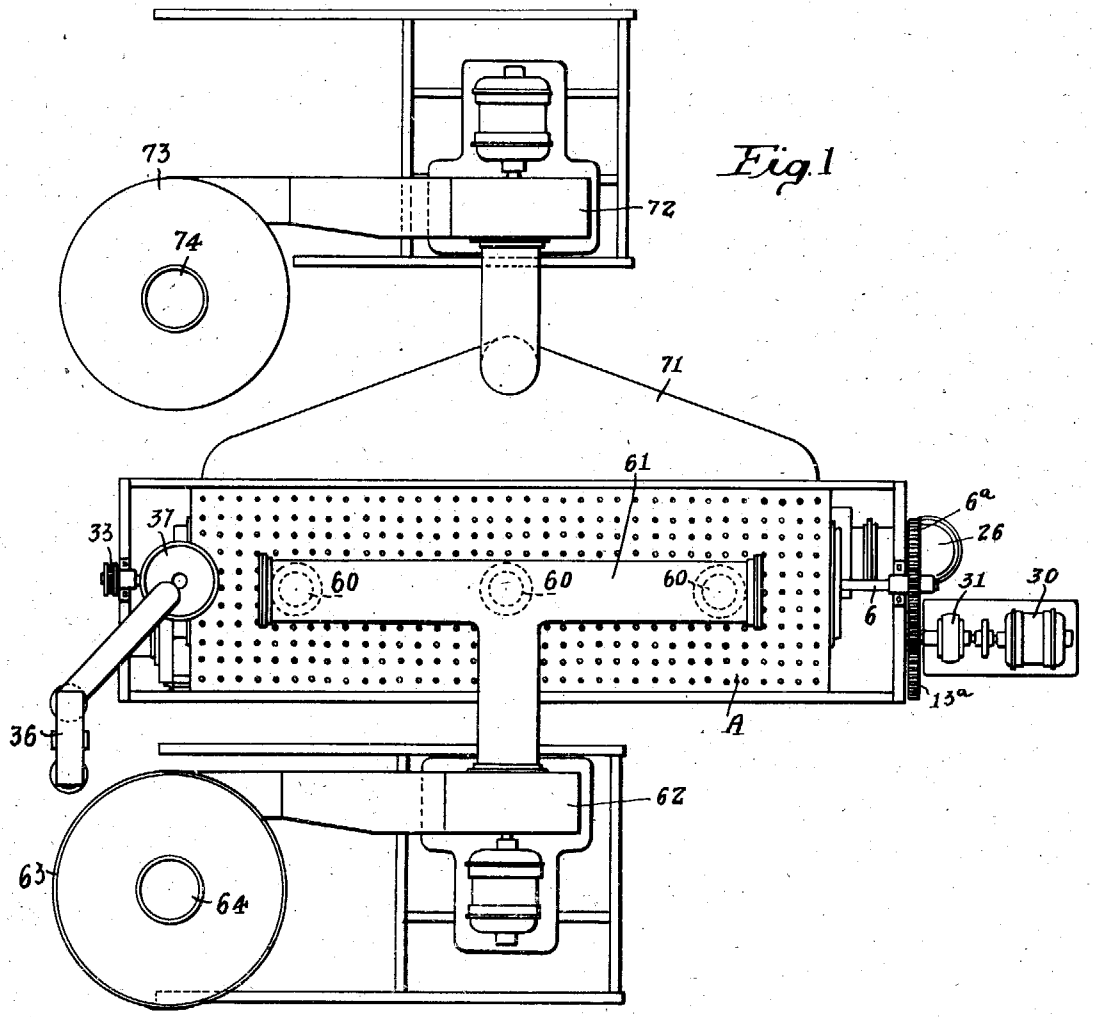
Fig. 1 is a plan view of the roasting apparatus.
Figures 2, 4, 5:
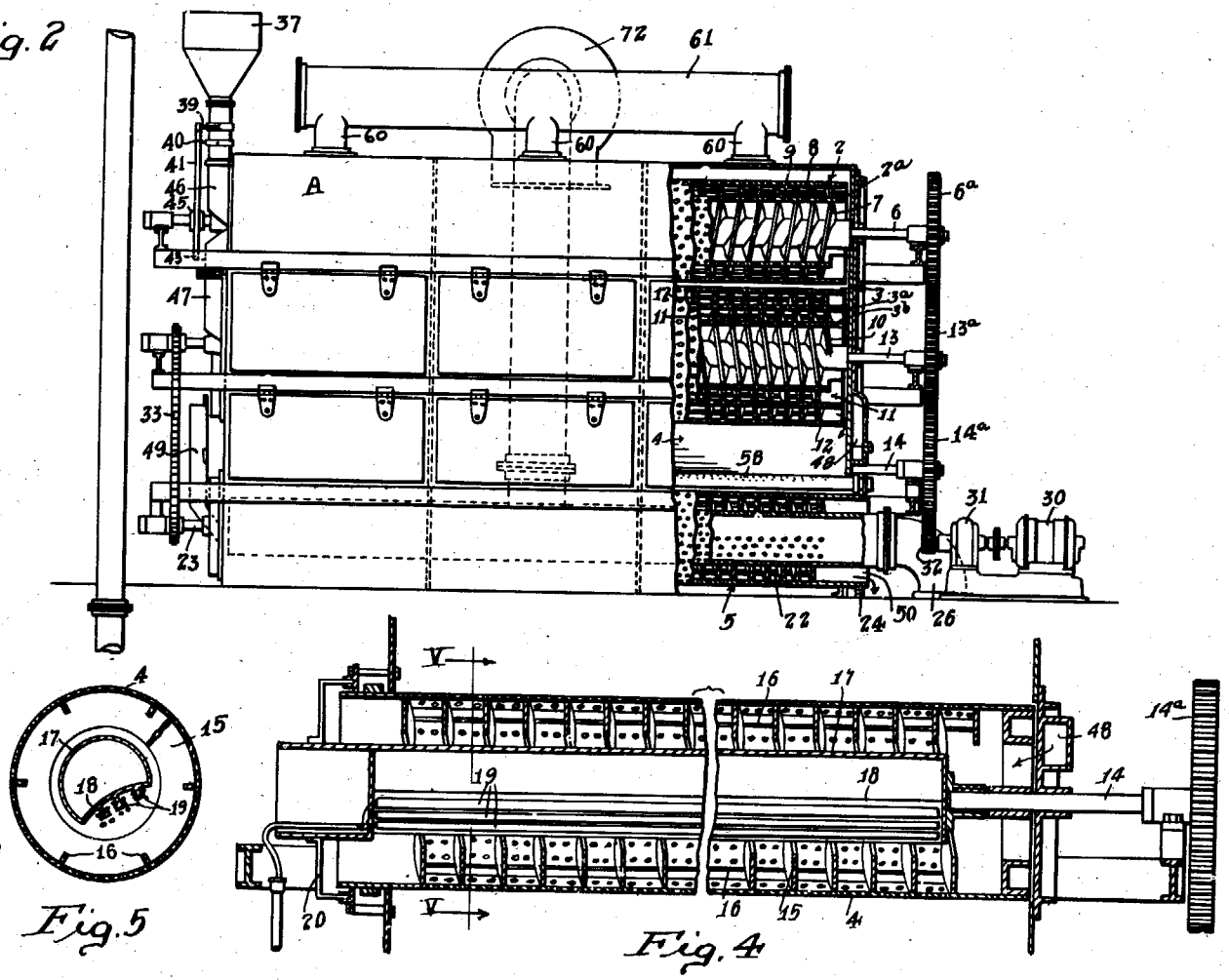
Fig. 2 is a side elevation partially in section.
Fig. 4 is a longitudinal sectional view of the roasting cylinder, in which the coffee is subjected to radiant heat energy.
Fig. 5 is a cross section taken on line 5, 5 of Fig. 4.
Figure 3:
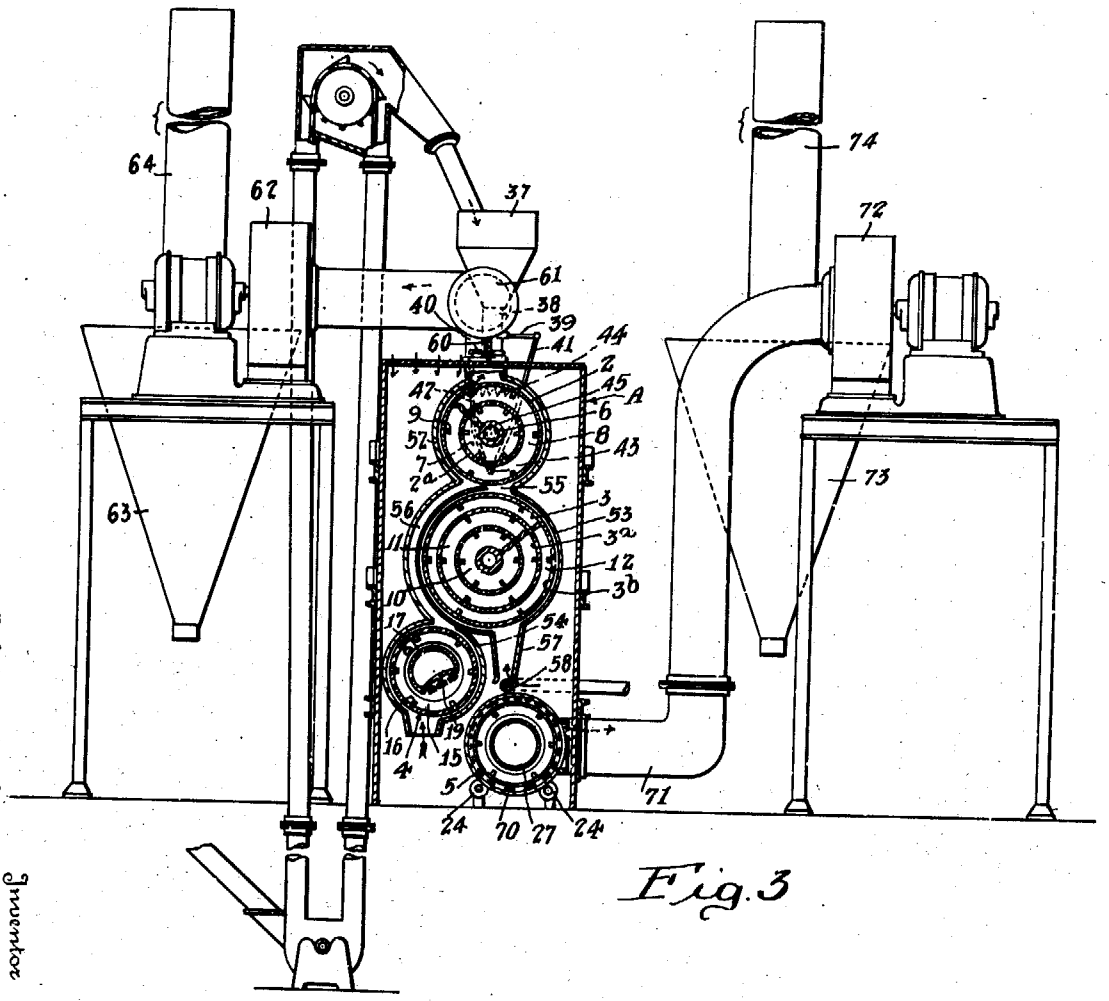
Fig. 3 is an end view partially in section.

Referring to the drawings in detail, particularly Figs. 1, 2 and 3, A indicates a rectangular shaped housing in which is supported a plurality of preheating, roasting and cooling cylinders, generally indicated at 2, 3, 4 and 5. The cylinder 2 consists of two concentric perforated cylindrical shells 2 and 2*a* supported by a shaft 6, the shells being spaced apart by helical conveyors indicated at 7 and 8, the helical conveyor 7 being secured to the shaft 6, and to the shell 2*a*, while the helical conveyor 8 is secured to the exterior of the shell 2*a* and to the interior of the shell 2. Agitating means such as longitudinal bars are also secured within the respective shells as indicated at 9, and these serve the function of agitating the coffee as it advances therethrough.

The cylinder 3 preferably comprises three concentric cylindrical shaped perforated shells, indicated at 3, 3*a* and 3*b*, these shells being spaced apart in a manner similar to the shells 2 and 2*a* by helical conveyors 10, 11 and 12, the conveyor 10 being secured to a shaft 13, and to the interior of the shell 3*b* and the conveyors 11 and 12 being interposed and secured to the shells 3 and 3*a*, in a manner similar to the conveyor 8.

As illustrated in the drawings, the cylinder 4 is supported by a shaft 14, and is best illustrated in Fig. 4. It comprises a cylindrical perforated shell 4 on the inner surface of which is secured a helical conveyor 15, and longitudinally extending agitator bars 16. Extending substantially through the cylinder 3 is a stationary housing 17, on the lower side of which is mounted a reflector 18, and a plurality of electrical heating elements 19. The outer end of the housing 17 is supported by a frame 20, while the inner end is supported by a shaft 14.

The lowermost cylinder 5 preferably consists of a perforated cylindrical shell, on the interior of which is secured a helical conveyor 21, and agitating bars 22. The cylinder 5 is supported at one end by a shaft 23, and at the opposite end by means of a pair of rollers 24. An air delivery pipe 26 extends substantially from end to end of the cylinder and centrally thereof, and the lower half of this pipe is perforated, as indicated at 27, to admit cooling air, as will hereinafter be described. The shafts 6, 13 and 14 supporting the cylinders 2, 3 and 4 are provided with intermeshing gears as indicated at 6*a*, 13*a* and 14*a* and these gears are driven by a motor or the like, indicated at 30, through a reduction gear 31 and a pinion 32. The cylinders are thus all driven in unison and in opposite directions and the cooling cylinder 5 is also driven in unison therewith, as a drive is provided through sprocket gears and a chain 33, from shaft 13 as shown.

The coffee to be roasted is conveyed from a storage bin in any suitable manner, as by a chute 35, to an elevator 36, and this elevator delivers it to a feeding bin 37, from where it is delivered in measured quantities by a feeding mechanism to the uppermost cylinder 2. The feeding mechanism which regulates the delivery of coffee may consist of a cylinder 38, in which are mounted two slide valves 39 and 40. These slide valves are connected with actuating arms 41 and 42, pivotally supported at their lower ends as at 43. The arms are connected by means of a spring 44, and they are actuated by a cam 45, secured on shaft 6, and as this shaft is continuously rotating, the slide valves will alternately open and close and measured quantities of coffee will accordingly intermittently be introduced. The coffee discharging from the feeding mechanism enters the innermost cylinder 2*a* through a chute 46, see Fig. 2. The spiral conveyor 7 mounted therein advances the coffee to the opposite end where it is delivered to the outermost conveyor 8, and the outer cylinder 2, and the coffee is returned by this conveyor and is delivered to a chute 47, which delivers it to the innermost cylinder 3*b*. It is here again advanced by the conveyor 10 to the opposite end, where it is delivered to the intermediate cylinder 3*a*, which returns it to the other end. It is then delivered to the outermost conveyor and cylinder 3, which again returns it and delivers it to a chute 48 from where it discharges into the cylinder 4. It passes through this cylinder and is discharged therefrom to a chute 49, which in turn delivers it to the cooling cylinder 5. It passes through this cylinder and finally discharges therefrom at the point 50, to a discharge chute or the like not here shown, which delivers it to the storage bins or whatever the case may be.

The cylinder 2 serves the function of preheating the coffee to drive off its moisture. The cylinder 3 that of partially roasting the coffee, the cylinder 4 that of completing the roasting operation, and the cylinder 5 that of rapidly cooling the coffee before it is discharged.

The cylinder 2 is enclosed by a housing 52, the cylinder 3 by a housing 53, and cylinder 4 by a housing 54. Communication is, however, maintained between the housings, for instance at the point 55 between the housings 52 and 53, and at the point 56 between the housings 53 and 54. The housing 53 has an extension formed thereon, as indicated at 57, and a gas burner 58 of suitable construction is mounted therein. This burner extends substantially from end to end of the cylinder 3, and the heat of the burner and the products of combustion pass upwardly through the housing 53, the cylinder 3 and then through the opening 55, into the housing 52 and the cylinders mounted therein, the heat and products of combustion finally escaping through pipes 60, which are connected with a common manifold 61 and the suction side of a fan 62. This discharges into a dust collector 63, which in turn is connected with a discharge stack 64. The coffee as it enters the cylinders 2 and 2*a* is merely subjected to a preliminary heating action and while passing through the cylinders 3, 3*a* and 3*b* to a partial roasting action, the final roasting action being accomplished when the coffee enters cylinder 4, as it is here subjected to the radiant heat energy of the heating elements 19. Thereafter the coffee discharges into the cooling cylinder 5, where it is cooled preferably by being subjected to an air blast discharging from the perforated pipe 26. The coffee is there rapidly cooled and discharged at the point 50, when the roasting and cooling operation is completed.

The cooling cylinder is surrounded by a housing 70. This is connected with a manifold 71, and this is in turn connected to the suction side of a fan 72, which delivers the air to a dust collector 73, and a stack 74.

In actual practice I have found that preliminary heating and roasting of the coffee may be accomplished in the presence of hot gases such as derived from a gas burner or the like without detrimental effect, but I have found that as the moisture in the bean has been driven off, and the coffee bean reaches a zone of higher temperature where the final roasting operation takes place, it becomes more or less absorptive, and has a tendency to absorb a certain proportion of the gases. This, of course, affects the taste and aroma of the coffee and is for this reason undesirable. In the present instance, the taste and aroma of the coffee is materially improved by subjecting the coffee to the direct action of radiant heat rays during the final roasting period. These rays are preferably unobstructed by any wall of metal between the mass of coffee and the heating element; that is to say, the mass of coffee is exposed directly to the radiant heat rays from the heating element. This final roasting takes place while the coffee is out of contact with the gases of combustion and air with which the preheating and partial roasting is effected. By arranging the preliminary heating and roasting cylinders as shown, that is, placing them concentrically one within the other, considerable space is conserved, the apparatus is reduced materially in size, and a more rigid structure results.

While the method and apparatus disclosed is more or less specifically illustrated and described, I wish it understood that various changes may be resorted to within the scope of the appended claims.

What I claim is:

1. A method of roasting coffee, which consists in subjecting the coffee to a roasting action by direct contact with hot gases of combustion, discontinuing the application of the hot gases of combustion at a point when the coffee bean becomes absorptive, and then completing the roasting by exposing the coffee to the action of radiant heat.

2. A method of roasting coffee, which consists in subjecting the coffee to a roasting action by direct contact with hot gases of combustion, discontinuing the application of the hot gases of combustion at a point when the coffee bean becomes absorptive, completing the roasting by exposing the coffee to the direct action of radiant heat, and then rapidly cooling the coffee.

3. In apparatus for roasting products such as coffee, the combination of means for subjecting the coffee to direct contact with hot gases of combustion until the coffee becomes absorptive, and means for subjecting the coffee thereafter to the action of radiant heat only, to complete the roasting thereof.

4. In apparatus for roasting products such as coffee, the combination of means for subjecting the coffee to direct contact with hot gases of combustion until the coffee becomes absorptive, means for subjecting the coffee thereafter to the action of radiant heat only, to complete the roasting thereof, and means for cooling the coffee thereafter to prevent over roasting of the mass of coffee by the heat in the mass of roasted coffee.

5. In apparatus for roasting products such as coffee, the combination of means for subjecting the coffee to direct contact with hot gases of combustion until the coffee becomes absorptive, means for effecting movement of the coffee out of contact with the gases of combustion thereafter, and electric heaters subjecting the coffee thereafter to the action of radiant heat to complete the roasting thereof.

6. In apparatus for roasting products such as coffee, the combination of means for subjecting the coffee to direct contact with hot gases of combustion to drive off the moisture and partially roast the coffee, means for effecting movement of the coffee out of contact with the gases of combustion thereafter, electric heaters for subjecting the coffee thereafter to the action of radiant heat to complete the roasting thereof, and means for cooling the coffee thereafter to prevent over-roasting of the coffee by the heat in the mass of roasted coffee.

7. In coffee roasting apparatus, the combination of a housing, a rotary cylinder within the housing, means for passing the coffee through the cylinder, means for passing hot gases of combustion through the cylinder and in contact with the coffee to effect the partial roasting of the coffee, another rotary cylinder within the housing receiving the partially roasted coffee from the first-named cylinder, and electrical heating means located within the last-named cylinder for subjecting the coffee to direct radiant heat to complete the roasting.

8. In coffee roasting apparatus, the combination of a rotary preheating cylinder, a rotary roasting cylinder below the preheating cylinder and receiving the preheated coffee therefrom, means for passing hot gases of combustion through the roasting cylinder and thence through the preheating cylinder in contact with the coffee to effect the partial roasting of the coffee, another rotary cylinder receiving the partially roasted coffee from the roasting cylinder, and electrical heating means located within the last-named cylinder for subjecting the coffee to direct radiant heat to complete the roasting.

9. In coffee roasting apparatus, the combination of a rotary preheating cylinder, a rotary roasting cylinder below the preheating cylinder and receiving the preheated coffee therefrom, means for passing hot gases of combustion through the roasting cylinder and thence through the preheating cylinder in contact with the coffee to effect the partial roasting of the coffee, another rotary cylinder receiving the partially roasted coffee from the roasting cylinder, electrical heating means located within the last-named cylinder for subjecting the coffee to direct radiant heat to complete the roasting, a rotary cooling cylinder receiving the completely roasted coffee, and means for blowing air through the cooling cylinder to cool the coffee.

10. In coffee roasting apparatus, the combination of a rotary preheating cylinder, a rotary roasting cylinder below the preheating cylinder and receiving the preheated coffee therefrom, said roasting cylinder comprising a plurality of nested cylindrical shells with perforated walls, means for guiding the coffee from the preheating cylinder to the innermost of said shells, means for guiding the coffee from the said innermost shell successively through the outer shells, means for passing hot gases of combustion through the perforated shells of the roasting cylinder in contact with the coffee to effect the partial roasting of the coffee, another rotary cylinder receiving the partially roasted coffee from the roasting cylinder, and electrical heating means located within the last-named cylinder for subjecting the coffee to direct radiant heat to complete the roasting.

LELAND S. MAEDE.